May 7, 1957  C. L. DIMMER  2,790,998
MOLDING METHOD
Filed Nov. 20, 1953  3 Sheets-Sheet 1
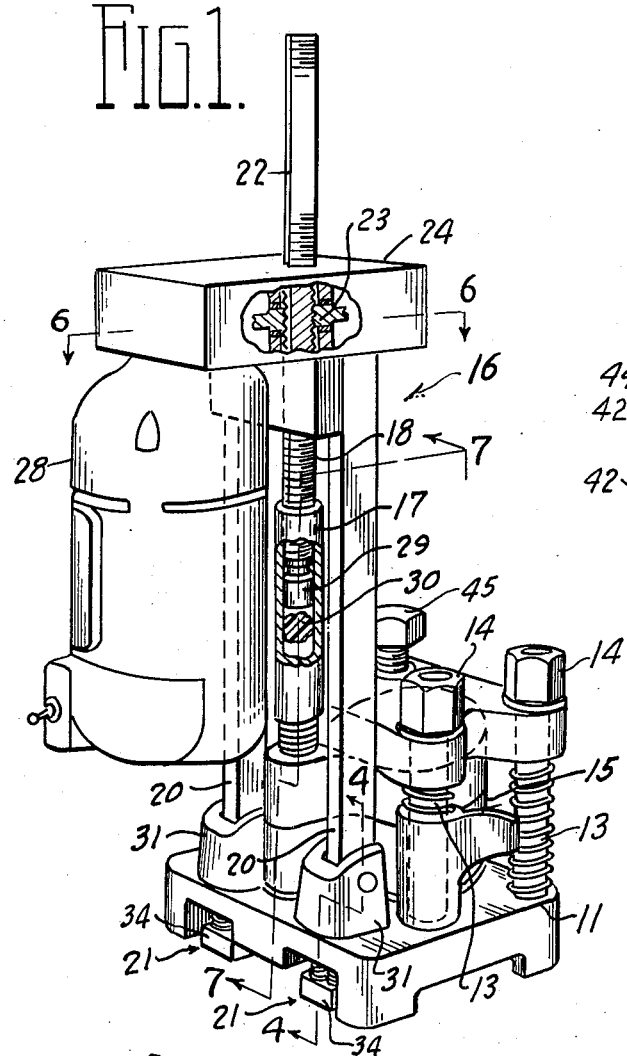
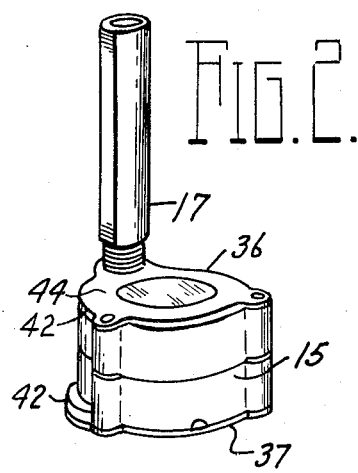
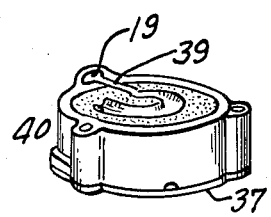
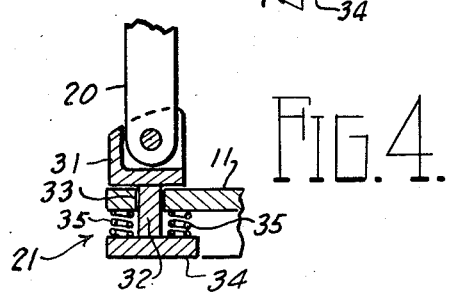
Inventor
CHARLES L. DIMMER
Owen & Owen
Attorneys May 7, 1957  C. L. DIMMER  2,790,998
MOLDING METHOD
Filed Nov. 20, 1953  3 Sheets-Sheet 2
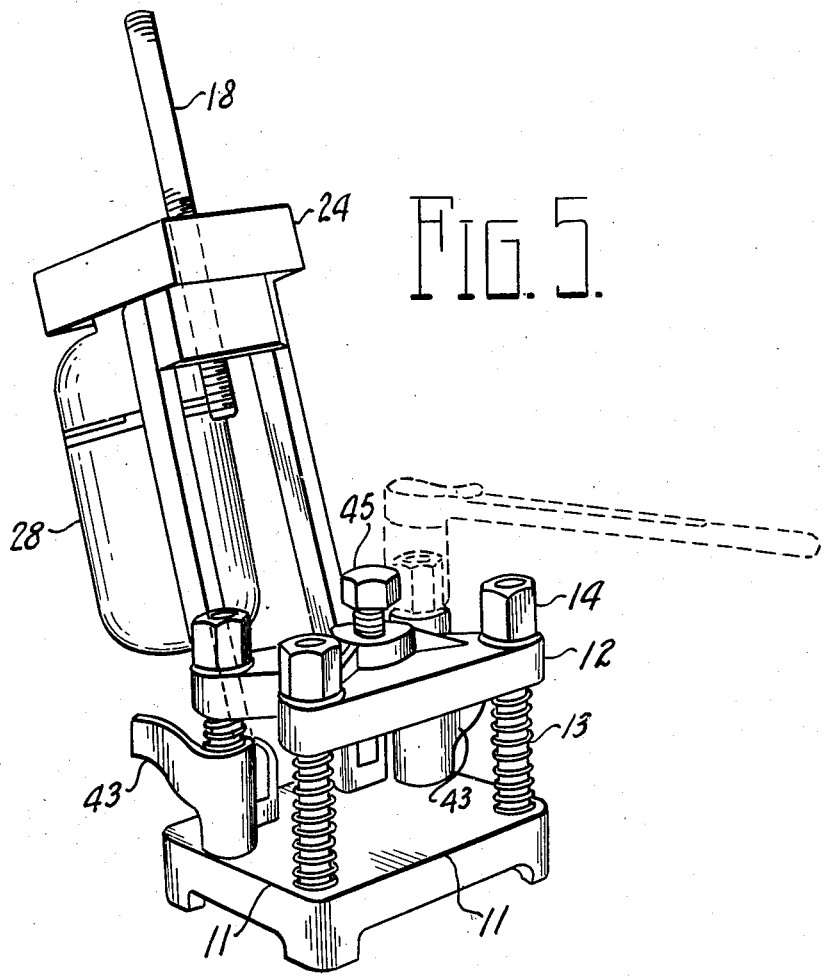
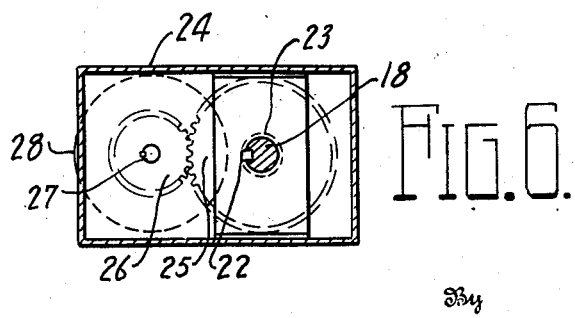
Inventor
CHARLES L. DIMMER May 7, 1957  C. L. DIMMER  2,790,998
MOLDING METHOD
Filed Nov. 20, 1953  3 Sheets-Sheet 3
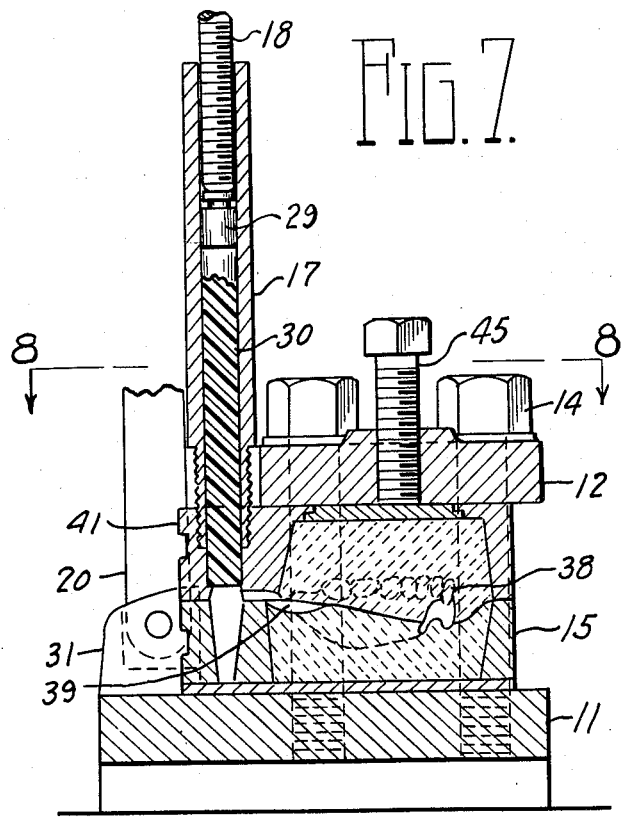
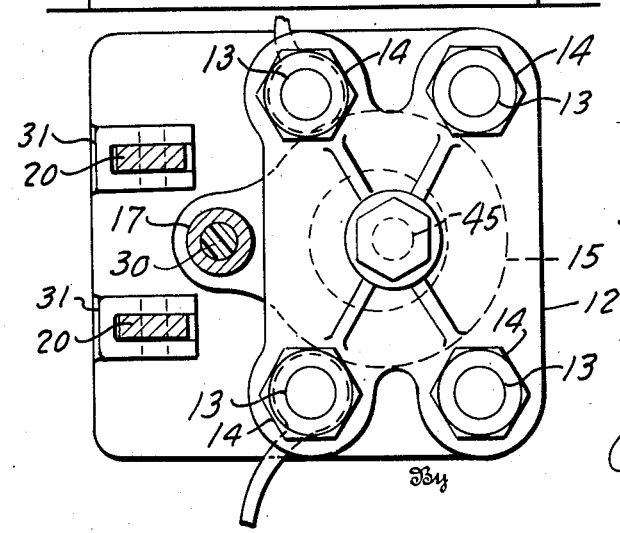
Inventor
CHARLES L. DIMMER
By Owen & Owen
Attorneys United States Patent Office 2,790,998
Patented May 7, 1957

2,790,998

MOLDING METHOD

Charles L. Dimmer, Toledo, Ohio, assignor to Toledo Dental Products Company, Toledo, Ohio, a corporation of Ohio Application November 20, 1953, Serial No. 393,367

11 Claims. (Cl. 18—55.1)

This invention relates to a molding method, and, more particularly, to an improved method for producing moldings from a synthetic resinous material by transfer or injection techniques in a single use investment mold.

Although both injection and transfer molding methods for the production of various parts from thermoplastic molding materials have been developed to a relatively high degree, this development has been largely concerned with mass production methods where the molding material is transferred or injected into a carefully machined closed mold of the permanent type. Little if any effort has been directed toward the production of relatively complicated small shapes where each part must differ somewhat from every other part, so that a temporary investment type of mold is required. By contrast with the relatively high degree of development in the transfer or injection molding field involving the use of closed permanent type molds, transfer or injection molding into a temporary investment type of mold involves numerous special problems. For example, investment type molds are ordinarily incapable of withstanding the pressures normally employed in injection or transfer molding, or are at least incapable of withstanding the pressures that can be used, if desired, when casting into permanent metal molds. Also, it is necessary to destroy the mold in order to obtain the desired finished part, so that one using this method of fabrication in an investment mold is obliged to make a satisfactory part on the first try or to begin from the beginning and produce a new mold for his second try. Although the cost of an investment mold is insignificant when compared with the cost of a metal mold to produce the same part, the cost per finished molding of an investment mold is substantially higher than this same cost for a metal mold, because the latter is capable of producing many thousand parts once it has been fabricated.

In the production of dentures and other prosthetic appliances as well as in the production of experimental parts for purposes of testing or market evaluation, it is frequently necessary to produce a single molding to a particular configuration. It is obvious that it is not practical to produce a metal mold for the fabrication of each such part as the mold itself would cost more than the finished article was worth.

Various expedients have heretofore been suggested for producing such parts by injection or transfer molding in investment molds. However, it has been found in the course of extensive work with such suggested expedients, that such techniques fail to produce satisfactory moldings in an unreasonably large percentage of cases where it is necessary to produce a relatively complicated part.

In this connection, a co-pending application Serial No. 241,252 now Patent No. 2,678,469, entitled "Materials Especially Suitable for Use In Fabricating Prosthetic Appliances and Dentures Fabricated Therefrom," filed August 10, 1951, of which this application is a continuation-in-part, discloses and claims a class of thermoplastic molding compounds meeting virtually all of the requirements needed in a material for fabricating dentures and other prosthetic appliances. It is possible to produce moldings of simple shape from such material merely by preheating injection slugs thereof for about 20 minutes at about 400° F., or to approximately their incipient softening temperature, placing the preheated slugs in an injection chamber, and forcing the preheated material through a restricted passage into a mold cavity formed in investment material as more fully described in the said co-pending application. However, when it was attempted to produce dentures and other prosthetic appliances in this way it was found that from 30 to 40 percent of the moldings produced had to be rejected because of cracks or molding stresses. When it is realized that the production of a completed denture or other prosthetic appliance may require as much as twelve hours of the time of a skilled dental technician, it will be appreciated that such molding method is not commercially acceptable.

The present invention is based upon the discovery of a method for producing moldings of complicated shape, for example, dentures and other prosthetic appliances, or any other complicated shape required in such small quantity that the production of a permanent mold is not warranted, which method has been found to result in sound moldings in virtually every instance. For example, several thousand dentures have been produced according to the present method from the material mentioned in the preceding paragraph without a single rejection. Satisfactory moldings have been produced almost without exception from other molding compositions as well.

It is therefore an object of the invention to provide an improved molding method for producing transfer or injection moldings from thermoplastic compositions.

It is a further object of the invention to provide an improved molding method for use with a specific class of molding compounds as hereinafter defined.

Other objects and advantages will be apparent from the description which follows, reference being had to the attached drawings showing an apparatus particularly adapted for practicing the method of the invention, in which:

Fig. 1 is a view in perspective, with parts broken away, showing one type of apparatus of the invention suitable for practicing the method of the invention;

Fig. 2 is a perspective view showing two mold halves in assembled condition with an injection cylinder mounted in place in operating position;

Fig. 3 is a view in perspective showing the details of the manner in which investment material is placed in the mold shown in Fig. 2;

Fig. 4 is a fragmentary cross sectional view showing the details of operation of one portion of the apparatus of Fig. 1;

Fig. 5 is a perspective view of a portion of the apparatus shown in Fig. 1, from a different angle, which shows the method of clamping a flask in place in the apparatus;

Fig. 6 is a view in cross section along the line 6—6 of Fig. 1;

Fig. 7 is a fragmentary cross sectional view along the line 7—7 in Fig. 1; and

Fig. 8 is a cross sectional view along the line 8—8 of Fig. 7.

According to the invention a method for preparing small moldings, i. e., not larger than about 4 ounces, in an open investment mold is provided. An extrusion slug of a homogeneous thermoplastic molding composition is pre-heated to an incipient plastic state, as will hereinafter be defined in more detail. A portion of the pre-heated extrusion slug is then injected, without the application of further heat, at a rate from about 0.3 to about 0.6 cubic inch per second, through an opening having a cross sectional area from about 0.03 to about 0.15 square inch, from an enclosed zone, into a mold cavity formed in an investment material cast around a previously removed wax or other model, and a portion of the thermoplastic material is forced from the mold through a riser or vent opening having a cross sectional area of from about 0.015 to about 0.075 square inch. The portion of the injection slug remaining in the enclosed zone is maintained under a pressure of from about 2000 to about 8000 pounds per square inch for at least 5 seconds after injection is completed.

It is preferred, according to the invention, that the rate at which pre-heated extrusion slugs are injected from an enclosed zone into the mold cavity is from 0.35 to 0.55 cubic inch per second, and most desired that it is from 0.4 to 0.5 cubic inch per second. It is also preferred that the cross sectional area of the sprue opening through which the material is forced into the mold cavity be from about 0.04 to about 0.1 square inch, and most preferred that it be from about 0.05 to about 0.06. Most desirably the cross sectional area of the riser or vent opening is approximately ½ the cross sectional area of the sprue opening. It is further preferred that the portion of the injection slug remaining in the enclosed zone be maintained under a pressure of from about 4000 to about 6000 pounds per square inch for at least five seconds after injection is completed. Such rates of injection, opening sizes, and pressures are preferred because it has been found that optimum molding results and minimum rejections can be achieved in such way.

The method of the invention will be more completely understood by reference in detail to the drawings which show one form of a transfer or injection molding press indicated generally at 10, suitable for the practice thereof. The molding press 10 comprises a base plate 11, having a spaced parallel clamping plate 12, threaded support means 13 cooperating with threaded retainers 14 for urging the clamping plate 12 against the top of a flask 15, and the base plate 11 against the bottom of the flask 15, resin injection means, indicated generally at 16, comprising a tubular resin cartridge 17 and a screw 18 for driving resin from the cartridge 17 into a gate opening 19 (Fig. 3) of the flask 15, a yoke 20 (Fig. 1) for the screw 18, and resilient yoke mounting means indicated generally at 21 linking the yoke 20 to the base plate 11.

The screw 18 is provided with a slot 22, and is keyed in an opening 23 of a housing 24 carried by the yoke 20. The screw 18 is moved relative to the housing 24 by a driven nut 25 (Fig. 6) driven by a spur pinion 26 mounted on a shaft 27 of a constant speed reversible motor 28. In the specific press illustrated the speed of the motor 28 and the gear ratios are so correlated that the screw 18 is driven at a rate of approximately one inch per second. A piston 29 rests upon an extrusion slug 30 having a diameter of about ¾ inch and is driven downwardly by the screw 18.

The resilient yoke mounting means 21 (Fig. 1) is composed of a pair of generally U-shaped fittings 31 hinged to the yoke 20 and resting on the base plate 11. The fittings 31 have downwardly projecting portions 32 (Fig. 4) which extend through openings 33 in the base plate 11 and are welded or otherwise attached to lower plates 34. Resilient spring members 35 are positioned between the lower surface of the base plate 11 and the upper surface of the plates 34.

The flask 15 (Figs. 2 and 3) is made up of mating upper and lower halves 36 and 37. An investment mold is prepared, in the manner well known in the art, by pouring the investment material around a previously prepared wax pattern in which are inset any inserts such as artificial teeth 38 (Fig. 7). The investment mold is cast in the flask 15 which is bored to form the gate opening 19, partially shown in Fig. 2, a sprue opening 39, and a riser or vent opening 40. The flask 15 has a threaded opening 41 (Fig. 1) concentric with the gate opening 19 for the reception of the resin cartridge 17 into which the screw 18 can be forced to inject resin into the mold.

As the first step in producing a denture or other molding in the mold the investment material is poured into the lower half 37 of the flask and the wax pattern set in its surface while the material is fluid. The top half of the flask (with its cover removed) is then assembled to the lower half. Wax leads are placed between the wax pattern and the sprue opening 39 and between the riser or vent opening 40 and the wax pattern at its point most distant from the sprue. The investment material is then poured into the top half of the flask and the cover put in place. After the investment sets, the wax pattern is melted out by placing the flask in boiling water, leaving teeth 38 or any other inserts retained in position in the mold formed by the hardened investment material.

It has been found to be impossible to produce injection or transfer moldings which are accurate reproductions of wax or other pattern in a closed investment mold, i. e., one having no riser or vent opening corresponding to the opening 40. The pressure necessary to cause a molding composition to fill such a closed investment type mold has been found to be sufficient to deform the investment material enough to prevent accurate reproduction. It has also been found that the sprue opening through which the thermoplastic molding composition enters the mold cavity must have at least a minimum cross sectional area within the range indicated above, and that the riser or vent opening must have a minimum cross sectional area within the range indicated above.

It has also been found to be essential, in producing moldings in an open investment mold according to the invention, that the thermoplastic molding composition be formed into an extrusion slug, and that the extrusion slug be heated to an incipient plastic state, and then extruded at a rate within the range indicated above through the sprue opening and into the mold cavity. The term "incipient plastic state" as used herein and in the appended claims can be defined as a condition where the molding composition is of approximately the consistency of jelly, readily capable of deformation and extrusion but not sufficiently fluid to be pourable. The precise temperature to which any given molding composition must be heated to reach an incipient plastic state is a function of the thermal characteristics of that particular material.

As an example of a material particularly suited for the injection or transfer molding of dentures and other prosthetic appliances, one produced by blending to a homogeneous mixture from 20 to 40 parts by weight of a resin A and from 80 to 60 parts by weight of a resin B may be mentioned. Resin A is a co-polymer of 96.0 to 96.5 percent by weight of styrene and 3.5 to 4.0 percent by weight of butadiene. Resin B is a co-polymer of about 75 percent by weight of styrene and 25 percent by weight of alpha methyl styrene. Resins A and B have approximately the physical characteristics set forth in Table I, below:

*Table I*

| | ASTM Test Method | Resin A | Resin B |
|---|---|---|---|
| Tensile Strength, ⅛" bar, p. s. i. | D638–46T | 3,500–5,000 | 6,500–7,500 |
| Elongation, percent | D638–46T | 18–25 | 1.6–2.3 |
| Modulus in Tension, × 10⁵ p.s.i. | D638–46T | 3.3–3.8 | 4.5–4.8 |
| Impact Strength: | | | |
| Izod notched, ⅛" bar, ft. lbs./in. of notch. | D256–47T | 1.0–1.5 | 0.2–0.6 |
| Izod unnotched, ⅛" bar, ft. lbs./in. of width. | | 9–16 | 2–6 |
| Heat Distortion, ⅛" bar, °F. | D648–45T | 155–163 | 182–189 |
| Rockwell Hardness | D785–48T | L70–80 | M68–80 |
| Specific Gravity | D792–48T | 1.04–1.06 | 1.05–1.07 |

After the mold is formed around the wax pattern and the wax removed, the flask is clamped in place between the base plate 11 and the clamping plate 12 by tightening the retainers 14. The cartridge 17, containing an extrusion slug 30 produced from a homogeneous blend of resin A and resin B, and preheated to an incipient plastic state, is then screwed into the threaded opening 41 of the flask 15; the piston 29 is placed in the cartridge; and the screw 18 is inserted in the upper end of the cartridge. The apparatus so assembled is shown in Figs. 7 and 8. The motor 28 is then started to drive the screw 18 downwardly at a rate of approximately 1 inch per second, extruding the composition first into the gate 19 and then through the sprue opening 39 into the mold where it flows throughout the mold cavity, closely surrounding the artificial teeth 38 or any other inserts, and forming the finished molding, finally being squeezed out the riser opening 40 where its appearance indicates that the mold cavity is filled.

When the molding composition is extruded through the riser opening 40 this portion of the material cools rapidly, and prevents further material from being extruded through this opening. Accordingly, the extrusion of additional molding composition from the cartridge 17 into the mold is resisted, so that further movement of the screw 18 exerts a greater force on the portion of the extrusion slug 30 remaining in the cartridge 17. This increased force is translated through the screw 18 to the yoke 20, and compresses the spring members 35. The motor 28 is then stopped, and the energy stored in the spring members 35 maintains a force of about 5000 p. s. i. on the portion of the extrusion slug 30 remaining in the cartridge 17. This force prevents the appearance of voids in the molding which would otherwise occur by virtue of slight shrinkage of the molding composition during cooling. It is essential that the riser opening 40 and the sprue opening 39 have minimum cross-sectional areas within the previously specified ranges in order that suitable pressures are exerted during the molding operation.

After the compound has cooled, the investment material is cut away and the molded denture or other object has the shape of the wax model originally inserted in the investment material in the flask 15.

Extrusion slugs produced from a uniform blend of resin A and resin B, which blend can be effected as described in the identified co-pending application, can be heated to an incipient plastic state by placing them in a cartridge 17 which has been previously pre-heated for approximately two hours in an electrically heated oven maintained at a temperature of approximately 400° F., and then returning the cartridge 17 containing the extrusion slug to an oven maintained at about 400° F. and leaving it there for approximately 30 minutes, for example from 20 to 40 minutes. It has been found by means of thermocouples embedded in the extrusion slugs that the resin temperature at the end of such heating is from about 380 to about 390° F. The extrusion slug is in an incipient plastic state in which it deforms when the cartridge is inverted but does not flow therefrom.

The procedure described in the preceding paragraph can also be used to heat to an incipient plastic state a styrene-acrylonitrile co-polymer containing over 96 percent of styrene, and now available from the Dow Chemical Company in sample lots for experimental purposes, although it is preferred to use approximately a 10° F. higher oven temperature with this copolymer.

Extrusion slugs produced from a low temperature polystyrene material can be heated to an incipient plastic state by the method described above with the variation that the oven temperature is approximately 340° F. Different samples of polymethylmethacrylate molding compositions have been formed into extrusion slugs and heated to an incipient plastic state using the described procedure and oven temperatures of 400° F., 430° F., and 460° F.

It has been found that the method of the invention is suitable for the injection or transfer molding of thermoplastic molding compositions generally, and that the only variation in the method necessary to accommodate different molding compositions is the temperature to which the extrusion slugs are heated prior to molding. In every case the temperature to which the extrusion slug must be heated is a temperature at which the material is in an incipient plastic state, and is approximately the minimum temperature at which an extrusion slug of that particular material will fill the mold cavity. The examples given above showing the heating of various thermoplastic molding compositions to an incipient plastic state are to be construed as exemplary only as it will be apparent that such slugs can be heated to an incipient plastic state in various other ways, e. g., by high frequency induction heating, and also that the method of the invention is applicable to the molding of thermoplastic materials generally, and not only to the specific materials identified.

The method of the invention is particularly suited for the molding of dentures and other relatively complicated shapes. For denture use the molding composition itself must be resistant to mouth acids, to temperatures up to about 180° F., or even 200° F., must be resistant to the action of alcohol in beverages, and must have relatively high strength characteristics. The homogeneous material produced by blending Resins A and B in the proportions above set forth and the styrene acrylonitrile copolymer previously identified are particularly suited for such use because of their excellence in these respects. Since the temperature at which a given thermoplastic material exists in an incipient plastic state is function of the temperature at which a molding produced therefrom is subject to heat distortion in use, most thermoplastic resins suitable for use in fabricating dentures in other prosthetic appliances exist in the incipient plastic state at temperatures above about 375° F., and ordinarily this temperature will be between about 375° F. and about 425° F. The major use developed to date for injection or transfer molding according to the invention is concerned with the fabrication of dentures and other prosthetic appliances. Therefore, it is usually preferred that the molding composition employed be one that exists in an incipient plastic state at a temperature between about 375° F. and about 425° F., most desirably at a temperature between about 380° F. and about 410° F.

It will be apparent that other molding presses can be substituted for the specific press 10 illustrated and described herein, and that various other changes and modifications can be made in the method of the invention without departing from the spirit of the claims.

This application is a continuation-in-part of application Serial No. 329,209, filed January 2, 1953, now abandoned.

Having described the invention, I claim:

1. A method for preparing a small molding in an investment mold that comprises, in combination, heating at about 400° F. for from 20 to 40 minutes an extrusion slug of a homogeneous mixture of from 20 to 40 parts by weight of a copolymer of 96.0 to 96.5 percent by weight of styrene and 3.5 to 4.0 percent by weight of butadiene having substantially the physical properties set forth for resin A in Table I hereof, and of from 80 to 60 parts by weight of a copolymer of about 75 percent by weight of styrene and about 25 percent by weight of alpha methyl styrene having physical properties substantially as set forth for resin B in Table I hereof, injecting from an enclosed zone, without the application of further heat, at a rate of from about 0.3 to about 0.6 cubic inch per second, through an opening having a minimum cross sectional area of from about 0.03 to about 0.15 square inch, and at least a portion of which has a maximum cross-sectional area not greater than about 0.15 square inch, a portion of the injection slug of the homogeneous mixture into a mold formed in an investment material cast around a previously removed wax model, and having an opening therefrom to atmosphere having a minimum cross sectional area from about 0.015 to about 0.075 square inch, and at least a portion of which has a maximum cross-sectional area not greater than about 0.075 square inch, and maintaining a pressure of from about 2000 to about 8000 pounds per square inch on the portion of the injection slug remaining in the enclosed zone for at least five seconds after injection is completed.

2. A method for preparing a small molding in an investment mold that comprises, in combination, heating to an incipient plastic state an extrusion slug of a homogeneous mixture of from 20 to 40 parts by weight of a copolymer of 96.0 to 96.5 percent by weight of styrene and 3.5 to 4.0 percent by weight of butadiene having substantially the physical properties set forth for resin A in Table I hereof, and of from 80 to 60 parts by weight of a copolymer of about 75 percent by weight of styrene and about 25 percent by weight of alpha methyl styrene having physical properties substantially as set forth for resin B in Table I hereof, injecting from an enclosed zone, without the application of further heat, at a rate of from about 0.3 to about 0.6 cubic inch per second, through an opening having a minimum cross sectional area of from about 0.03 to about 0.15 square inch, and at least a portion of which has a maximum cross-sectional area not greater than about 0.15 square inch, a portion of the injection slug of the homogeneous mixture into a mold formed in an investment material cast around a previously removed wax model, and having an opening therefrom to atmosphere having a minimum cross sectional area from about 0.015 to about 0.075 square inch, and at least a portion of which has a maximum cross-sectional area not greater than about 0.075 square inch, and maintaining a pressure of from about 2000 to about 8000 pounds per square inch on the portion of the injection slug remaining in the enclosed zone for at least five seconds after injection is completed.

3. A method for preparing a small molding in an investment mold that comprises, in combination, heating at about 400° F. for from 20 to 40 minutes an extrusion slug of a homogeneous mixture of from 20 to 40 parts by weight of a copolymer of 96.0 to 96.5 percent by weight of styrene and 3.5 to 4.0 percent by weight of butadiene having substantially the physical properties set forth for resin A in Table I hereof, and of from 80 to 60 parts by weight of a copolymer of about 75 percent by weight of styrene and about 25 percent by weight of alpha methyl styrene having physical properties substantially as set forth for resin B in Table I hereof, injecting from an enclosed zone, without the application of further heat, at a rate of from about 0.35 to about 0.55 cubic inch per second, through an opening having a minimum cross sectional area of from about 0.03 to about 0.15 square inch, and at least a portion of which has a maximum cross-sectional area not greater than about 0.15 square inch, a portion of the injection slug of the homogeneous mixture into a mold formed in an investment material cast around a previously removed wax model, and having an opening therefrom to atmosphere having a minimum cross sectional area from about 0.015 to about 0.075 square inch, and at least a portion of which has a maximum cross-sectional area not greater than about 0.075 square inch, and maintaining a pressure of from about 2000 to about 8000 pounds per square inch on the portion of the injection slug remaining in the enclosed zone for at least five seconds after injection is completed.

4. A method for preparing a small molding in an investment mold that comprises, in combination, heating at about 400° F. for from 20 to 40 minutes an extrusion slug of a homogeneous mixture of from 20 to 40 parts by weight of a copolymer of 96.0 to 96.5 percent by weight of styrene and 3.5 to 4.0 percent by weight of butadiene having substantially the physical properties set forth for resin A in Table I hereof, and from 80 to 60 parts by weight of a copolymer of about 75 percent by weight of styrene and about 25 percent by weight of alpha methyl styrene having physical properties substantially as set forth for resin B in Table I hereof, injecting from an enclosed zone, without the application of further heat, at a rate from about 0.4 to about 0.5 cubic inch per second, through an opening having a minimum cross sectional area of from about 0.03 to about 0.15 square inch, and at least a portion of which has a maximum cross-sectional area not greater than about 0.15 square inch, a portion of the injection slug of the homogeneous mixture into a mold formed in an investment material cast around a previously removed wax model, and having an opening therefrom to atmosphere having a minimum cross sectional area from about 0.015 to about 0.075 square inch, and at least a portion of which has a maximum cross-sectional area not greater than about 0.075 square inch, and maintaining a pressure of from about 2000 to about 8000 pounds per square inch on the portion of the injection slug remaining in the enclosed zone for at least five seconds after injection is completed.

5. A method for preparing a small molding in an investment mold that comprises, in combination, heating at about 400° F. for from 20 to 40 minutes an extrusion slug of a homogeneous mixture of from 20 to 40 parts by weight of a copolymer of 96.0 to 96.5 percent by weight of styrene and 3.5 to 4.0 percent by weight of butadiene having substantially the physical properties set forth for resin A in Table I hereof, and of from 80 to 60 parts by weight of a copolymer of about 75 percent by weight of styrene and 25 percent by weight of alpha methyl styrene having physical properties substantially as set forth for resin B in Table I hereof, injecting from an enclosed zone, without the application of further heat, at a rate of from about 0.4 to about 0.5 cubic inch per second, through an opening having a minimum cross sectional area of from about 0.04 to about 0.1 square inch, and at least a portion of which has a maximum cross-sectional area not greater than about 0.1 square inch, a portion of the injection slug of the homogeneous mixture into a mold formed in an investment material cast around a previously removed wax model, and having an opening therefrom to atmosphere having a minimum cross sectional area from about 0.02 to about 0.05 square inch, and at least a portion of which has a maximum cross-sectional area not greater than about 0.05 square inch, and maintaining a pressure of from about 2000 to about 8000 pounds per square inch on the portion of the injection slug remaining in the enclosed zone for at least five seconds after injection is completed.

6. A method for preparing a small molding in an investment mold that comprises, in combination, heating at about 400° F. for about 30 minutes an extrusion slug of a homogeneous mixture of from 20 to 40 parts by weight of a copolymer of 96.0 to 96.5 percent by weight of styrene and 3.5 to 4.0 percent by weight of butadiene having substantially the physical properties set forth for resin A in Table I hereof, and of from 80 to 60 parts by weight of a copolymer of about 75 percent by weight of styrene and about 25 percent by weight of alpha methyl styrene having physical properties substantially as set forth for resin B in Table I hereof, injecting from an enclosed zone, without the application of further heat, at a rate of from about 0.4 to about 0.5 cubic inch per second, through an opening having a minimum cross sectional area of from about 0.05 to about 0.06 square inch, and at least a portion of which has a maximum cross-sectional area not greater than about 0.06 square inch, a portion of the injection slug of the homogeneous mixture into a mold formed in an investment material cast around a previously removed wax model, and having an opening therefrom to atmosphere having a minimum cross sectional area from about 0.025 to about 0.03 square inch, and at least a portion of which has a maximum cross-sectional area not greater than about 0.03 square inch, and maintaining a pressure of from about 4000 to about 6000 pounds per square inch on the portion of the injection slug remaining in the enclosed zone for at least five seconds after injection is completed.

7. A method for preparing a small molding in an investment mold that comprises, in combination, heating an extrusion slug of a thermoplastic synthetic resinous molding composition to an incipient plastic state, injecting from an enclosed zone, without the application of further heat, at a rate of from about 0.3 to about 0.6 cubic inch per second, through an opening having a minimum cross sectional area of from about 0.03 to about 0.15 square inch, and at least a portion of which has a maximum cross-sectional area not greater than about 0.15 square inch, a portion of the injection slug of the molding composition into a mold formed in an investment material cast around a previously removed wax model, and having an opening therefrom to atmosphere having a minimum cross sectional area from about 0.015 to about 0.75 square inch, and at least a portion of which has a maximum cross-sectional area not greater than about 0.075 square inch, and maintaining a pressure of from about 2000 to about 8000 pounds per square inch on the portion of the injection slug remaining in the enclosed zone for at least five seconds after injection is completed.

8. A method for preparing a small molding in an investment mold that comprises, in combination, heating an extrusion slug of a thermoplastic synthetic resinous molding composition to an incipient plastic state, injecting from an enclosed zone, without the application of further heat, at a rate from about 0.35 to about 0.55 cubic inch per second, through an opening having a minimum cross sectional area of from about 0.03 to about 0.15 square inch, and at least a portion of which has a maximum cross-sectional area not greater than about 0.15 square inch, a portion of the injection slug of the molding composition into a mold formed in an investment material cast around a previously removed wax model, and having an opening therefrom to atmosphere having a minimum cross sectional area from about 0.015 to about 0.075 square inch, and at least a portion of which has a maximum cross-sectional area not greater than about 0.075 square inch, and maintaining a pressure of from about 2000 to about 8000 pounds per square inch on the portion of the injection slug remaining in the enclosed zone for at least five seconds after injection is completed.

9. A method for preparing a small molding in an investment mold that comprises, in combination, heating an extrusion slug of a thermoplastic synthetic resinous molding composition to an incipient plastic state, injecting from an enclosed zone, without the application of further heat at a rate of from about 0.4 to about 0.5 cubic inch per second, through an opening having a minimum cross sectional area of from about 0.03 to about 0.15 square inch, and at least a portion of which has a maximum cross sectional area not greater than about 0.15 square inch, a portion of the injection slug of the molding composition into a mold formed in an investment material cast around a previously removed wax model, and having an opening therefrom to atmosphere having a minimum cross sectional area from about 0.015 to about 0.075 square inch, and at least a portion of which has a maximum cross-sectional area not greater than about 0.075 square inch, and maintaining a pressure of from about 2000 to about 8000 pounds per square inch on the portion of the injection slug remaining in the enclosed zone for at least five seconds after injection is completed.

10. A method for preparing a small molding in an investment mold that comprises, in combination, heating an extrusion slug of a thermoplastic synthetic resinous molding composition to an incipient plastic state, injecting from an enclosed zone, without the application of further heat, at a rate of from about 0.4 to about 0.5 cubic inch per second, through an opening having a minimum cross sectional area of from about 0.04 to about 0.1 square inch, and at least a portion of which has a maximum cross-sectional area not greater than about 0.1 square inch, a portion of the injection slug of the molding composition into a mold formed in an investment material cast around a previously removed wax model, and having an opening therefrom to atmosphere having a minimum cross sectional area from about 0.02 to about 0.05 square inch, and at least a portion of which has a maximum cross-sectional area not greater than about 0.05 square inch, and maintaining a pressure of from about 2000 to about 8000 pounds per square inch on the portion of the injection slug remaining in the enclosed zone for at least five seconds after injection is completed.

11. A method for preparing a small molding in an investment mold that comprises, in combination, heating an extrusion slug of a thermoplastic synthetic resinous molding composition to an incipient plastic state, injecting from an enclosed zone, without the application of further heat, at a rate of from about 0.4 to about 0.5 cubic inch per second, through an opening having a minimum cross sectional area of from about 0.05 to about 0.06 square inch, and at least a portion of which has a maximum cross-sectional area not greater than about 0.06 square inch, a portion of the injection slug of the molding composition into a mold formed in an investment material cast around a previously removed wax model, and having an opening therefrom to atmosphere having a minimum cross sectional area from about 0.025 to about 0.03 square inch, and at least a portion of which has a maximum cross-sectional area not greater than about 0.03 square inch, and maintaining a pressure of from about 2000 to about 8000 pounds per square inch on the portion of the injection slug remaining in the enclosed zone for at least five seconds after injection is completed.

References Cited in the file of this patent

UNITED STATES PATENTS

| 1,533,625 | Williams | Apr. 14, 1925 |
| 2,573,805 | Neustadter | Nov. 16, 1951 |
| 2,620,512 | Larson | Dec. 9, 1952 |
| 2,678,469 | Dimmer | May 18, 1954 |